Nov. 14, 1944.  W. T. STEPHENS  2,362,945
HYDRAULIC CONTROL VALVE
Filed June 30, 1942  2 Sheets-Sheet 1
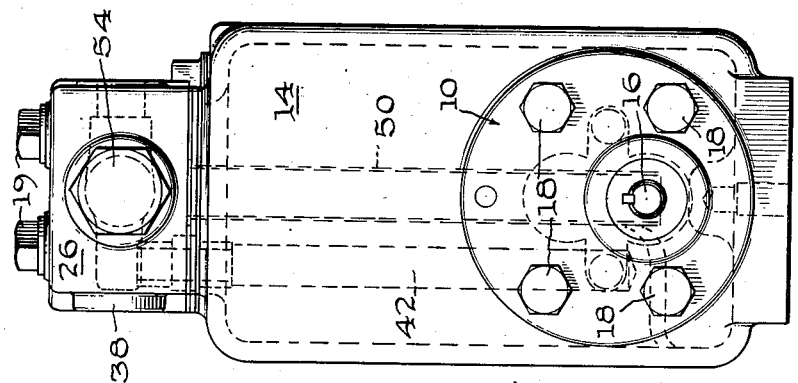
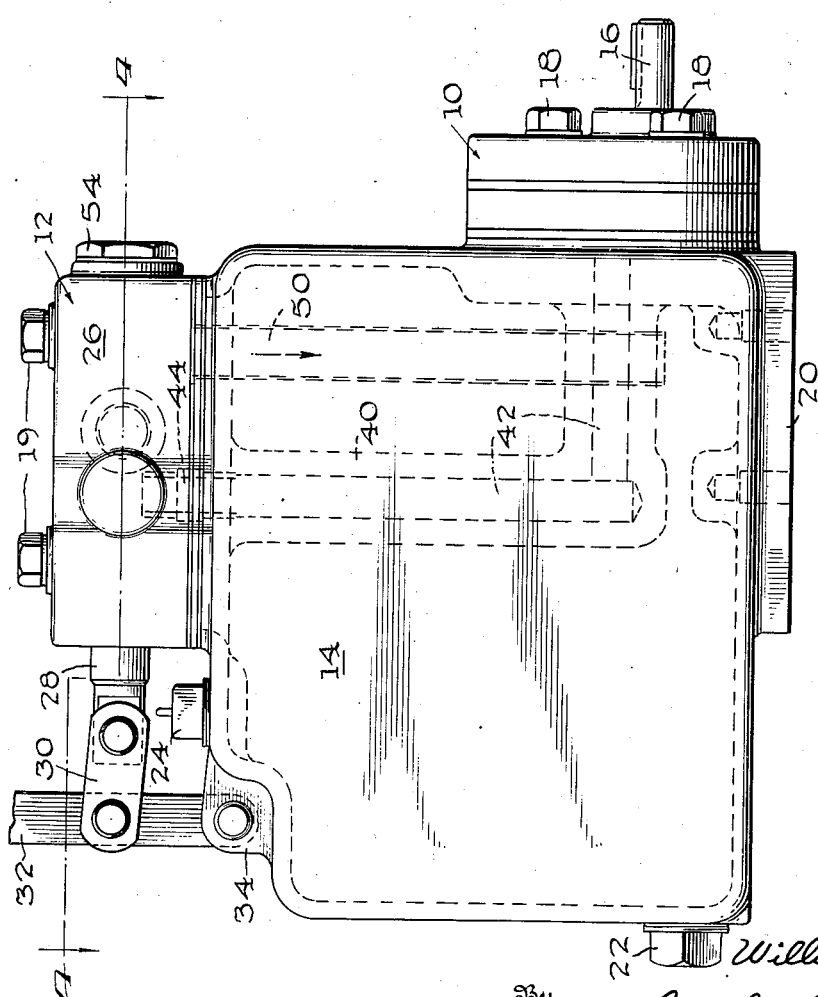
Inventor
William T. Stephens
By Leech & Radue
Attorneys

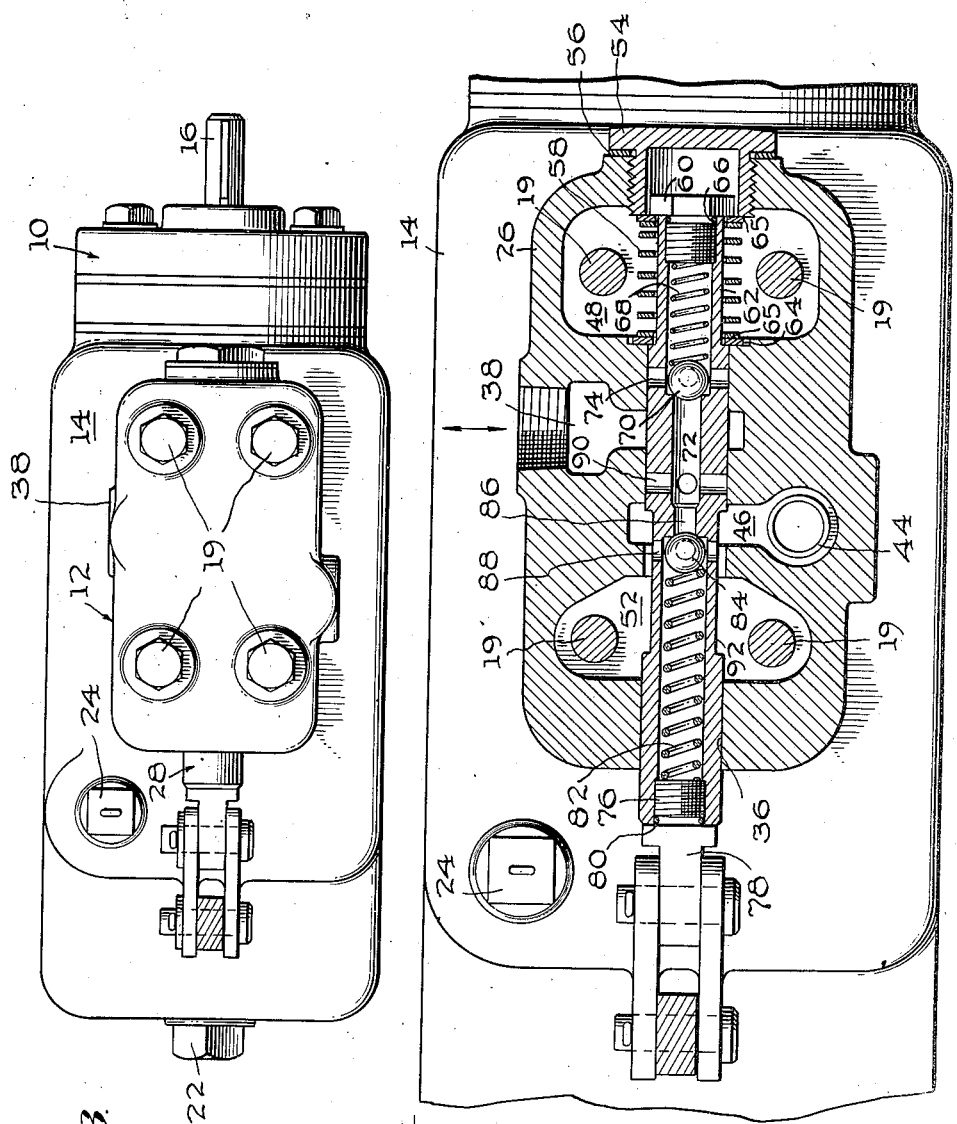

Patented Nov. 14, 1944

2,362,945

UNITED STATES PATENT OFFICE 2,362,945

HYDRAULIC CONTROL VALVE

William T. Stephens, Cleveland, Ohio, assignor to Hydraulic Control Engineering Company, Cleveland, Ohio, a corporation of Ohio Application June 30, 1942, Serial No. 449,133

14 Claims. (Cl. 277—7)

The invention to be described relates to hydraulic control valves and particularly to a plunger or spool type of valve of hollow formation embodying both check and relief valves in the plunger itself. An important field of application for such a valve is in the operation of hydraulic rams, hoists, and similar hydraulic motor devices.

One of the principal purposes of the invention is to provide a plunger type of control valve of hollow formation with an interiorly disposed check valve means for preventing undesired return flow from the hydraulic device with which the control is used, and an also interiorly disposed relief valve for guarding the system against excessive or destructive hydraulic pressure.

Another important object of this invention is achieved by the novel relation of the hollow valve plunger and a cooperating valve housing which requires a minimum of boring or machining and in which all of the necessary operating parts may be placed in assembled relation with the plunger previous to insertion of the latter in its housing. This construction results in very simple and rugged form of control valve which may be manufactured at surprisingly low cost.

A special feature of the control valve embodying this invention is that no sealing is required between the reciprocating valve plunger and the housing in which it is contained by reason of the arrangement of the high pressure ports or passages of the housing in a central position with respect to the housing bore and with a low pressure port or passage outwardly of each and adjacent the respective ends of the valve housing. In this way, the pressure operating within the valve housing is rendered inappreciable adjacent the ends of the valve plunger and sealing is thus eliminated.

One of the other objects resides in the provision of a tank or reservoir for the hydraulic fluid which is specially shaped for cooperation with the housing of the control valve and the hydraulic pump which supplies pressure thereto so that these three parts form a compact and substantially integral unit with the elimination of interconnections.

Other features of novelty contributing to efficiency of operation and ease of manufacture will be apparent from a reading of the following detained description of a preferred embodiment of the invention, taken in connection with the accompanying drawings, in which Fig. 1 is a side elevation of an assembled unit comprising a control valve, a pump and a reservoir tank;

Fig. 2 is an end elevation of the unit of Fig. 1;

Fig. 3 is a top plan view of the same unit; and

Fig. 4 is an enlarged plan view partly in section as seen from the line 4—4 of Fig. 1.

Note is made of the fact that some of the broadly novel features of the hollow control valve plunger combination are disclosed and claimed in the co-pending application of William T. Stephens, Serial No. 449,132 filed June 30, 1942.

Referring particularly to Fig. 1, a conventional gear pump 10 and a control valve 12 embodying the novel features of this invention are detachably secured to an enclosed fluid reservoir or tank 14. The pump 10 is provided with an external pump shaft 16 for keying to a suitable drive (not shown) and is secured to the right end of the tank 14 near the bottom by means such as a spaced set of securing screws 18. In similar manner, a series of downwardly extending screws 19 pass through the control valve 12 and secure it in sealed relation to the top side of the tank 14 with which it is in fluid communication. It is also to be observed that the bottom of the tank 14 is provided with a tapped base portion 20 by means of which it can be mounted on an internal combustion engine, for example.

As is customary, the tank 14 is provided with a pipe plug drain 22 at its left end adjacent the bottom and a filling and breathing plug 24 positioned at the top.

The control valve which has been designated generally as 12 includes a chambered housing 26 and a reciprocating valve plunger 28. The left end of the plunger 28 which extends beyond the valve housing 26 is pivotally connected to a pair of links 30 which are in turn pivotally joined to an operating lever 32 which has its lower end mounted for rotation between an upstanding pair of integral lugs 34 at the top of the tank 14.

In the enlarged horizontal section of Fig. 4, it will be seen that the valve housing 26 is formed to provide a plunger bore 36 extending therethrough from end to end. A tapped fluid pressure outlet and return port 38 for supplying the hoist, ram, or jack with which the unit is employed extends inwardly from one side of the housing 26, intersecting the plunger bore 36 and completely surrounding the plunger 28 within the bore.

The tank 14 as seen in Fig. 1 has an internal cast formation 40 of right-angle shape which is bored to provide a passage 42 of the same shape leading directly from the delivery side of the gear pump 10 to the top of the tank where it receives and supports a collared pipe 44 extending upwardly into a pressure inlet passage and port 46 surrounding the housing bore 36 for the purpose of introducing pressure hydraulic fluid to the control valve. The ports 38 and 46 are adjacent each other and positioned approximately midway of the length of the housing bore 36, which bore terminates at its right end in an enlarged discharge passage 48 extending downward to the bottom of the valve housing in open communication with a flanged drain pipe 50 secured between the top of the tank 14 and the valve housing 26, as indicated in Fig. 1. The drain pipe 50 extends nearly to the bottom of the tank 14 to a point adjacent the suction side of the pump 10 and affords some resistance to the return flow of hydraulic fluid to the reservoir tank 14. Such an arrangement of the drain pipe 50 has the additional beneficial effect of preventing foaming of the supply of oil or other hydraulic fluid within the tank 14.

Referring again to Fig. 4, the chambered valve housing 26 includes at its left and an enlarged passage or port 52 surrounding the valve bore 36 and extending downwardly into open communication with the tank 14.

The right end of the valve bore 36, beyond which the plunger 28 never extends, is closed by a hollow screw cap 54 sealed by a gasket 56. A coiled, centering or neutralizing spring 58 surrounds the valve plunger 28 within the discharge passage 48 and is secured at one end by a threaded plug and cap 60 tapped into the right end of the hollow valve plunger. While the head of plug 60 fits loosely within the hollow screw cap 54, the inwardly extending end of the latter serves as a seat for the spring 58 in the "neutral" position illustrated by Fig. 4. The valve plunger 28 is formed to provide also a shouldered land portion 62 for receiving the neutralizing spring 58 and the valve housing 26 is shaped to form a countersunk seat 64 for the inner end of the spring 58. Washers 65 and 65 may be used at the respective ends of the spring 58 to provide continuous seating areas of good width for either pushing or, in cooperation with the cap 54 or housing 26, holding the corresponding end of spring 58 as the plunger 28 is moved right or left of "neutral" position. In view of the possibility of leakage endwise of the hollow valve plunger 28, its threaded plug 60 is provided with a resilient seal ring 66 cooperating with the interior of the plunger.

It is the right end of the hollow plunger 28 which carries the check valve means, which means preferably comprises a relatively light check valve spring 68 bearing at one end on the end of plug 60 and at the other upon a check member in the form of a ball 70 seating across the smaller intermediate passage portion 72 of the valve plunger 28, and controlling the passage of hydraulic pressure fluid from an immediately adjacent side delivery port 74.

In like manner, the left end of the hollow valve plunger 28 is tapped to receive a threaded end 76 of a lug 78 and is provided with a resilient sealing ring 80 acting between the interior of the valve plunger and the end 76. As previously indicated, the lug 78 is pivotally connected to the links 30 associated with the operating lever 32. A relatively heavy relief valve spring 82 acts against the threaded end 76 and a relief valve member 84 preferably in the form of a ball for the sake of simplicity and economy. The ball member 84 seats over the adjacent end of a reduced part 86 of the plunger bore to close this end of the bore at a point slightly inward of a side delivery port 88.

Between the longitudinally spaced side delivery port 74 and side delivery port 88 adjacent the respective check valve means is an inlet and outlet side delivery port 90 controlled only by the passage or unported portions of the plunger bore 36.

It will be appreciated that the side delivery ports 74, 88, and 90 may be of any desired shape and may constitute outwardly opening slots in the valve plunger 28, but it has been found preferable to provide a circumferentially spaced series of moderate sized drilled openings of circular shape at each of these places. Other forms of port openings are more difficult to produce and tend to impair the perfect cylindrical shape of a relatively small hollow valve plunger of the type described.

The side delivery relief port or ports 88 lie within an extended groove part 92 of plunger 28, the length of this groove part being sufficient to provide a by-pass between the hydraulic fluid-pressure inlet port 46 and the combination by-pass and relief port 52 when the plunger 28 is in its "neutral" and "lower" positions.

The operation of the control valve will now be explained with reference to Fig. 4. The spring 58 which has one of its ends in abutment with the valve housing 26 and the other with the cap 54 normally maintains the valve plunger 28 in the "neutral" position which is illustrated. At this time, the unpassaged or unintersected portions of the valve bore 36 effectively block both the side delivery ports 74 and 90, and the ball member 84 of the relief valve means is not exposed to any hydraulic fluid pressure. Note is also made that the grooved portion 92 of the valve plunger 28 affords a good sized ring shaped by-pass opening from the pressure inlet passage 46 directly to the enlarged hydraulic fluid port 52 which is in open communication with the top of the reservoir tank 14.

By a small amount of movement to the left, the valve plunger 28 can be placed in its "raise" position with the intermediate side delivery ports 90 communicating with the hydraulic fluid pressure supply port 46. Pressure hydraulic fluid thus introduced is blocked on the left by the relief valve ball 84 and constrained to flow through the valve plunger to the right where it unseats the lightly spring-pressed check ball 70 and discharges into the hydraulic fluid outlet port 38 which has, at the same time, been placed in hydraulic fluid communication with the side delivery ports 74. Obviously, the one-way action of the check valve means including the ball member 70 will prevent return flow from the ram or hoist attached to the outlet port 38. In this manner, failure of the pump will not result in the ram or hoist dropping or releasing suddenly in a way which may be very dangerous.

A skilled operator can obtain a throttled raising operation by manipulating the valve plunger 28 so that the by-pass between hydraulic fluid pressure supply port 46 and relief port 52 is only partially closed and the inlet side delivery ports 90 are only partially open to the supply of pressure hydraulic fluid.

The valve plunger 28 is moved to the right of the position shown in establishing a "lower" position which is accompanied by a free by-pass from the pump 10 through the port 46 past the plunger groove 92 and out the combination by-pass and relief port 52. However, in the "lower" position the intermediate side delivery ports 90 serve as inlet ports taking returned flow from the tapped outlet 38. Again being blocked by the superior resistance of the relief valve ball member 84, the hydraulic fluid returned from the hydraulic jack or ram or the like will unseat the check valve ball 70 and discharge through the side delivery ports 74 which are now in free and open communication with the enlarged discharge port or passage 48 whence the hydraulic fluid is returned to the tank 14 through the drain pipe 50. It is likewise possible to obtain a throttled lowering action by only partially opening the inlet side delivery ports 90 and the side delivery ports 74.

In the normal operation of the control valve 12 and the hydraulic fluid motor device with which it is associated, the relief valve means will function only to block one end of the hollow control valve plunger 28 through the medium of the ball member 84. In the raising operation the relief valve means will function to relieve excessive hydraulic fluid pressure and return it to the reservoir tank 14 in the event that the motor or other hydraulic device should meet with unusual resistance or the then open part of the hydraulic fluid circuit should be pressure blocked in some other manner. As will be recalled, in the lowering operation the check valve means having the ball 70 and responsive to a lesser hydraulic fluid pressure is effective in relieving pressure produced by return of hydraulic fluid from the hydraulic device port 38. It would, however, be possible for the relief valve means to function selectively during the lowering operation should there be an abnormal surge of returned hydraulic fluid of such a pressure and volume that the check valve means could not handle all of the flow. This suggests further utility of the novel arrangement of dual valve means within the hollow control valve plunger in which the high pressure hydraulic fluid discharged past the relief valve means could be used in the operation of some other device.

In view of the probable use of the control valve plunger assembly for other related purposes and as a replacement unit for control valves having check and relief valve means separate from the valve plunger, it is contemplated that this assembly will be produced as an article of manufacture apart from any particular valve housing.

The utter simplicity of the unit which has been described and its consequent low manufacturing cost will be even more apparent from a brief description of its fabrication. The hydraulic pump 10 has its housing cast to fit the corresponding side of the tank 14 and has its delivery and suction ports communicating directly with the tank. The tank 14 itself is cast as a unit to include the angled formation 40 providing passage 42 from the delivery side of the pump 10 to the top of the tank, which has its required openings also formed in the casting operation. The chambered valve housing 26 is a one-piece casting so formed that its ports or passages 46, 48 and 52 communicate directly with corresponding openings provided in the top of the tank 14. It is necessary only to accurately finish the cast bore 36 for the valve plunger and to tap the outlet port 38 and thread the opening for the end closure or screw cap 54.

As will be obvious from the preceding detailed description, maximum convenience for assembly adjustment and repair is provided by the hollow plunger 28 carrying the check and relief valve means, and the neutralizing spring 58. The hollow valve plunger 28 itself can be formed merely by concentric boring and radial drilling.

It will be apparent to those skilled in the art that the principles of the invention specifically illustrated herein may be applied to other forms of control valves in which the parts are differently arranged and different forms of the valve elements employed without departing from the scope of the appended claims.

What is claimed as new and desired to be secured by Letters Patent of the United States is:

1. A hydraulic control valve comprising in combination, a reciprocable, hollow valve plunger, said valve plunger being formed to provide side delivery ports at three longitudinally spaced points; check valve means arranged within the valve plunger and adapted yieldingly to close one end inwardly of the side delivery port adjacent that end, relief valve means arranged within the valve plunger and adapted yieldingly to close the other end inwardly of the side delivery port adjacent that end; and a valve housing provided with a bore receiving the reciprocable hollow valve plunger and a plurality of passages including an inlet, discharge and outlet passage intersecting said bore in operative relation to the various side delivery ports of said valve plunger, and said housing and plunger being so constructed that said relief valve side ports are always in communication with said discharge passage.

2. A hydraulic control valve comprising in combination, a reciprocable, hollow valve plunger, said valve plunger being formed to provide side delivery ports at three longitudinally spaced points; a spring-pressed check valve arranged within the valve plunger to close one end inwardly of the side delivery port adjacent that end; a spring-pressed relief valve arranged within the valve plunger to close the other end inwardly of the side delivery port adjacent that end; and a valve housing provided with a bore receiving the reciprocable hollow valve plunger and a plurality of passages including an inlet, discharge and outlet passage intersecting said bore in operative relation to the various side delivery ports of said valve plunger, said housing and plunger being so constructed that the discharge and outlet passages are always connected through said check valve when the plunger is adjusted to register the outlet passage and the center delivery port.

3. A hydraulic control valve comprising in combination, a reciprocable, hollow valve plunger, said valve plunger being formed to provide a set of circumferentially spaced side delivery ports at three longitudinally spaced points; a spring-pressed check valve arranged within the valve plunger to close one end inwardly of the side delivery port adjacent that end; a spring-pressed relief valve arranged within the valve plunger to close the other end inwardly of the side delivery port adjacent that end; and a valve housing provided with a bore receiving the reciprocable hollow valve plunger and a plurality of passages including an inlet, discharge and outlet passage intersecting said bore in operative relation to the various side delivery ports of said valve plunger, said housing and plunger being so constructed that the center set of delivery ports may register with either the inlet or outlet passage or be entirely closed off.

4. A hydraulic control valve comprising in combination, a reciprocable, hollow valve plunger, said valve plunger being formed to provide side delivery ports at three longitudinally spaced points; a spring-pressed check valve arranged within the valve plunger to close one end inwardly of the side delivery port adjacent that end; a spring-pressed relief valve arranged within the valve plunger to close the other end inwardly of the side delivery port adjacent that end; and a valve housing provided with a bore receiving the reciprocable hollow valve plunger, a hydraulic fluid pressure supply passage arranged for cooperation with the intermediate side delivery port of the valve plunger, a hydraulic fluid outlet and inlet port communicating with the outside of the valve housing and arranged for optional cooperation with the intermediate and the side delivery port at one end of the valve plunger, a hydraulic fluid discharge passage arranged for cooperation with the same end side delivery port of the valve plunger, and a combined pressure relief and by-pass discharge passage arranged for cooperation with the side delivery port at the other end of the valve plunger, all of said passages and ports intersecting the valve bore, and said valve plunger having an extended groove portion of sufficient length to afford a free by-pass between the hydraulic fluid pressure supply passage and the relief and by-pass discharge passage when the valve plunger is in an intermediate neutral or lower position.

5. A hydraulic control valve comprising in combination, a reciprocable, hollow valve plunger, said valve plunger being formed to provide side delivery ports at three longitudinally spaced points; a spring-pressed check valve arranged within the valve plunger to close one end inwardly of the side delivery port adjacent that end; a spring-pressed relief valve arranged within the valve plunger to close the other end inwardly of the side delivery port adjacent that end; a valve housing provided with a bore receiving the reciprocable hollow valve plunger, a hydraulic fluid pressure supply passage arranged for cooperation with the intermediate side delivery port of the valve plunger, a hydraulic fluid outlet and inlet port communicating with the outside of the valve housing and arranged for optional cooperation with the intermediate and the side delivery port at one end of the valve plunger, a hydraulic fluid discharge passage arranged for cooperation with the same end side delivery port of the valve plunger, and a combined pressure relief and by-pass discharge passage arranged for cooperation with the side delivery port at the other end of the valve plunger, all of said passages and ports intersecting the valve bore, and said valve plunger having an extended groove portion of sufficient length to afford a free by-pass between the hydraulic fluid pressure supply passage and the relief and by-pass discharge passage when the valve plunger is in an intermediate neutral or lower position; a detachable cap secured to the valve housing over one end of the bore; and spring means within the valve housing for centering the valve plunger, said spring means being connected in operative relation to the valve housing and the valve plunger.

6. An article of manufacture comprising in combination a hollow valve plunger, said valve plunger of cylindrical form being provided with three side delivery ports appreciably spaced longitudinally thereof; a first spring-pressed check valve arranged within the valve plunger yielding to close one end against lengthwise outward flow at a point inwardly of the side delivery port adjacent that end; a second spring-pressed check valve arranged within the valve plunger at a point inwardly of the side delivery port adjacent to and yielding to close the other end against lengthwise outward flow of relatively greater pressure than that to which the first check valve responds, said plunger having a portion of reduced diameter extending from a position intermediate the center delivery port and the delivery port adjacent the relief valve, said reduced portion extending considerably beyond the last mentioned delivery port.

7. A hydraulic control valve for a single acting hoist or the like, comprising in combination, a valve housing provided with a longitudinal bore, said housing having an inlet passage for high pressure liquid, a discharge passage at one side of the inlet passage, a passage for connection to a hoist on the other side of said inlet passage and a return passage beyond the hoist passage, all of said passages intersecting the said bore, a valve plunger reciprocable in said bore and ported for cooperation with said passages, said porting being such that in the neutral or repose position of the plunger the first two passages are in full open communication the remaining passages positively closed, and said hoist connected passage being closed against flow in either direction to lock the hoist against movement.

8. A hydraulic control valve for a single acting hoist or the like, comprising in combination, a valve housing provided with a longitudinal bore, said housing having an inlet passage for high pressure liquid, a discharge passage at one side of the inlet passage, a passage for connection to a hoist on the other side of said inlet passage and a return passage beyond the hoist passage, all of said passages intersecting the said bore, a valve plunger reciprocable in said bore and ported for cooperation with said passages, said porting being such that in the neutral or repose position of the plunger the first two passages are in communication only around the outside of said plunger and the remaining passages positively closed, in the hoist position the first and third passages only are connected through the interior of the plunger and in the lower position the third and fourth passages are connected through the interior of the plunger.

9. A hydraulic control valve for a single acting hoist or the like, comprising in combination, a valve housing provided with a longitudinal bore, said housing having an inlet passage for high pressure liquid, a discharge passage at one side of the inlet passage, a passage for connection to a hoist on the other side of said inlet passage and a return passage beyond the hoist passage, all of said passages intersecting the said bore, a valve plunger reciprocable in said bore and ported for cooperation with said passages said porting being such that in the neutral or repose position of the plunger the first two passages are in communication and the remaining passages closed, and in hoist position the first and third passages only are connected, said valve plunger including a spring pressed relief valve said porting being such that the relief valve is inserted between the first passage and the second passage whenever the valve plunger disconnects these passages.

10. A hydraulic control valve for a single act ing hoist or the like, comprising in combination, a valve housing provided with a longitudinal bore, said housing having an inlet passage for high pressure liquid, a discharge passage at one side of the inlet passage, a passage for connection to a hoist on the other side of said inlet passage and a return passage beyond the hoist passage, all of said passages intersecting the said bore, a valve plunger reciprocable in said bore and ported for cooperation with said passages, said porting being such that in the neutral or repose position of the plunger the first two passages are in communication and the remaining passages closed, and in the hoist position the first and third passages only are connected through the interior of the plunger, and in the lower position the third and fourth passages are connected through the interior of the plunger, said valve plunger including a check valve and said porting being such that the check valve is inserted between the first and third passages when the plunger is in the hoist position and between the third and fourth passages when the plunger is in the lower position.

11. A hydraulic control valve comprising in combination, a reciprocable, hollow valve plunger, said valve plunger being formed to provide a set of circumferentially spaced side delivery ports at three longitudinally spaced points; a spring-pressed check valve arranged within the valve plunger to close one end inwardly of the side delivery port adjacent that end; a spring-pressed relief valve arranged within the valve plunger to close the other end inwardly of the side delivery port adjacent that end; and a valve housing provided with a bore receiving the reciprocable hollow valve plunger and a plurality of passages including an inlet, discharge and outlet passage intersecting said bore in operative relation to the various side delivery ports of said valve plunger, said housing and plunger being so constructed that the center set of delivery ports is the only one adapted to admit fluid to the interior of said valve plunger and may be registered with the outlet passage.

12. A hydraulic control valve for use with a single acting hoist including in combination a hollow valve plunger, said valve plunger being provided with three side delivery ports appreciably spaced longitudinally thereof; a first spring-pressed check valve arranged within the valve plunger yielding to close one end against lengthwise outward flow at a point inwardly of the side delivery port adjacent that end; and a second spring-pressed check valve arranged within the valve plunger at a point inwardly of the side delivery port adjacent to and yielding to close the other end against lengthwise outward flow of relatively greater pressure than that to which the first check valve responds, a housing having a close fitting bore to receive said plunger, a high pressure inlet passage, a discharge passage and a hoist passage all intersecting said bore, said plunger being movable to register the center delivery port with either the high pressure inlet or the hoist passage, means to insure normal fluid flow always through the low pressure check valve when the registry is as described.

13. A hydraulic control valve for use with a single acting hoist including in combination a hollow valve plunger, said valve plunger being provided with three side delivery ports appreciably spaced longitudinally thereof; a first spring-pressed check valve arranged within the valve plunger yielding to close one end against lengthwise outward flow at a point inwardly of the side delivery port adjacent that end; and a second spring-pressed check valve arranged within the valve plunger at a point inwardly of the side delivery port adjacent outward flow of relatively greater pressure than that to which the first check valve responds, a housing having a close fitting bore to receive said plunger, a high pressure inlet passage, a discharge passage and a hoist passage all intersecting said bore, said plunger being movable to register the center delivery port with either the high pressure inlet or the hoist passage, means to insure normal fluid flow always through the low pressure check valve when the registry is as described, and means to connect the high pressure inlet to the discharge passage whenever the center delivery port does not register with the high pressure inlet.

14. A hydraulic control valve for use with a single acting hoist including in combination a hollow valve plunger, said valve plunger being provided with three side delivery ports appreciably spaced longitudinally thereof; a first spring-pressed check valve arranged within the valve plunger yielding to close one end against lengthwise outward flow at a point inwardly of the side delivery port adjacent that end; and a second spring-pressed check valve arranged within the valve plunger at a point inwardly of the side delivery port adjacent outward flow of relatively greater pressure than that to which the first check valve responds, a housing having a close fitting bore to receive said plunger, a high pressure inlet passage, a discharge passage and a hoist passage all intersecting said bore, said plunger being movable to register the center delivery port with either the high pressure inlet or the hoist passage, means to insure normal fluid flow always through the low pressure check valve when the registry is as described, means to connect the high pressure inlet to the discharge passage whenever the center delivery port does not register with the high pressure inlet and means to associate the high pressure check valve discharge port with the discharge passage for all positions of the plunger.

WILLIAM T. STEPHENS.